US011972628B2

(12) United States Patent
Bouzari et al.

(10) Patent No.: US 11,972,628 B2
(45) Date of Patent: Apr. 30, 2024

(54) ULTRASONIC IMAGING DEVICE AND METHOD FOR IMAGE ACQUISITION IN THE ULTRASONIC DEVICE

(71) Applicant: FINGERPRINT CARDS ANACATUM IP AB, Gothenburg (SE)

(72) Inventors: Hamed Bouzari, København Ø (DK); Farzan Ghavanini, Mölndal (SE)

(73) Assignee: FINGERPRINT CARDS ANACATUM IP AB, Gothenburg (SE)

( * ) Notice: Subject to any disclaimer, the term of this patent is extended or adjusted under 35 U.S.C. 154(b) by 67 days.

(21) Appl. No.: 17/615,126

(22) PCT Filed: Jun. 1, 2020

(86) PCT No.: PCT/SE2020/050550
§ 371 (c)(1),
(2) Date: Nov. 30, 2021

(87) PCT Pub. No.: WO2020/251445
PCT Pub. Date: Dec. 17, 2020

(65) Prior Publication Data
US 2022/0237939 A1    Jul. 28, 2022

(30) Foreign Application Priority Data

Jun. 10, 2019 (SE) .................................... 1950681-5
Jun. 10, 2019 (SE) .................................... 1950682-3

(51) Int. Cl.
*G06V 40/13* (2022.01)
*G06F 3/043* (2006.01)
*G06F 3/044* (2006.01)

(52) U.S. Cl.
CPC .......... *G06V 40/1306* (2022.01); *G06F 3/043* (2013.01); *G06F 3/044* (2013.01);
(Continued)

(58) Field of Classification Search
CPC ..... G06V 40/1306; G06F 3/043; G06F 3/044; G06F 2203/04106; G06F 2203/04108; A61B 5/00
See application file for complete search history.

(56) References Cited

U.S. PATENT DOCUMENTS 9,979,955 B1    5/2018  Guo
9,984,271 B1    5/2018  King et al.
(Continued)

FOREIGN PATENT DOCUMENTS

EP    1046928 A2    10/2000
EP    1884197 A1    2/2008
(Continued)

OTHER PUBLICATIONS

International Search Report and Written Opinion for International Application No. PCT/SE2020/050550 dated Aug. 14, 2020 (14 pages).
(Continued)

*Primary Examiner* — Jonathan A Boyd
(74) *Attorney, Agent, or Firm* — Westman, Champlin & Koehler, P.A.

(57) ABSTRACT

Method for image acquisition in an ultrasonic biometric imaging device, the method comprising: determining a target area of a touch surface; by a plurality of ultrasonic transducers arranged at a periphery of the touch surface, emitting a shaped ultrasonic beam towards the target area using transmit beamforming; by the ultrasonic transducers, receiving reflected ultrasonic echo signals defined by received RF-data, the reflected ultrasonic echo signals resulting from interactions with an object in contact with the touch surface at the target area; subtracting background RF-data from the received RF-data to form a clean image; performing receive side beamforming to form a reconstructed image from the clean image; and for a plurality of
(Continued)

reconstructed images resulting from a plurality of emitted ultrasonic beams for a given target area, adding the plurality of reconstructed images to form a summed image.

6 Claims, 5 Drawing Sheets

(52) U.S. Cl.
CPC .............. *G06F 2203/04106* (2013.01); *G06F 2203/04108* (2013.01)

(56) References Cited

U.S. PATENT DOCUMENTS

| | | |
|---|---|---|
| 10,198,610 B1 | 2/2019 | Yousefpor et al. |
| 2007/0169555 A1* | 7/2007 | Gao ..................... H04R 1/403 73/620 |
| 2015/0055821 A1 | 2/2015 | Fotland |
| 2015/0189136 A1* | 7/2015 | Chung ................. G06F 3/0443 348/77 |
| 2017/0053151 A1 | 2/2017 | Yazandoost et al. |
| 2017/0090028 A1 | 3/2017 | Djordjev et al. |
| 2017/0231534 A1 | 8/2017 | Agassy et al. |
| 2017/0316243 A1 | 11/2017 | Ghavanini |
| 2018/0011193 A1* | 1/2018 | Brown ................ G01S 7/52034 |
| 2018/0055369 A1* | 3/2018 | Burns .................. A61B 5/6898 |
| 2018/0157893 A1* | 6/2018 | Lee .................... G06V 40/1365 |
| 2018/0218195 A1* | 8/2018 | Sheik-Nainar ....... G06V 10/141 |
| 2019/0094981 A1 | 3/2019 | Bradski et al. |
| 2020/0160018 A1* | 5/2020 | Panchawagh ........ H10N 30/857 |

FOREIGN PATENT DOCUMENTS

| | | |
|---|---|---|
| WO | 2017052836 A1 | 3/2017 |
| WO | 2019125273 A1 | 6/2019 |

OTHER PUBLICATIONS

International Search Report and Written Opinion for International Application No. PCT/SE2020/050552 dated Aug. 14, 2020 (12 pages).
Extended European Search Report from EP Application No. 20823519.2, dated Oct. 12, 2023.

* cited by examiner

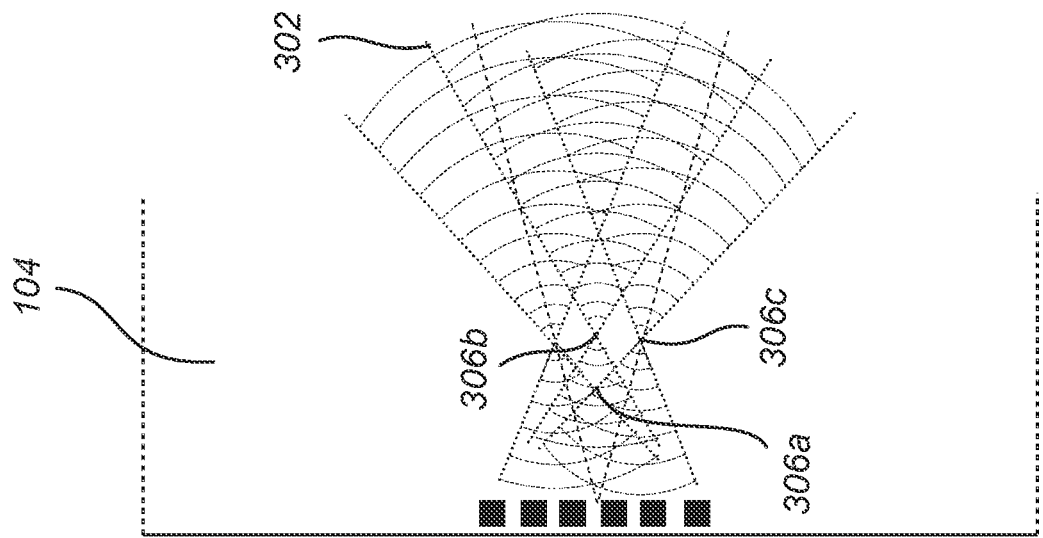
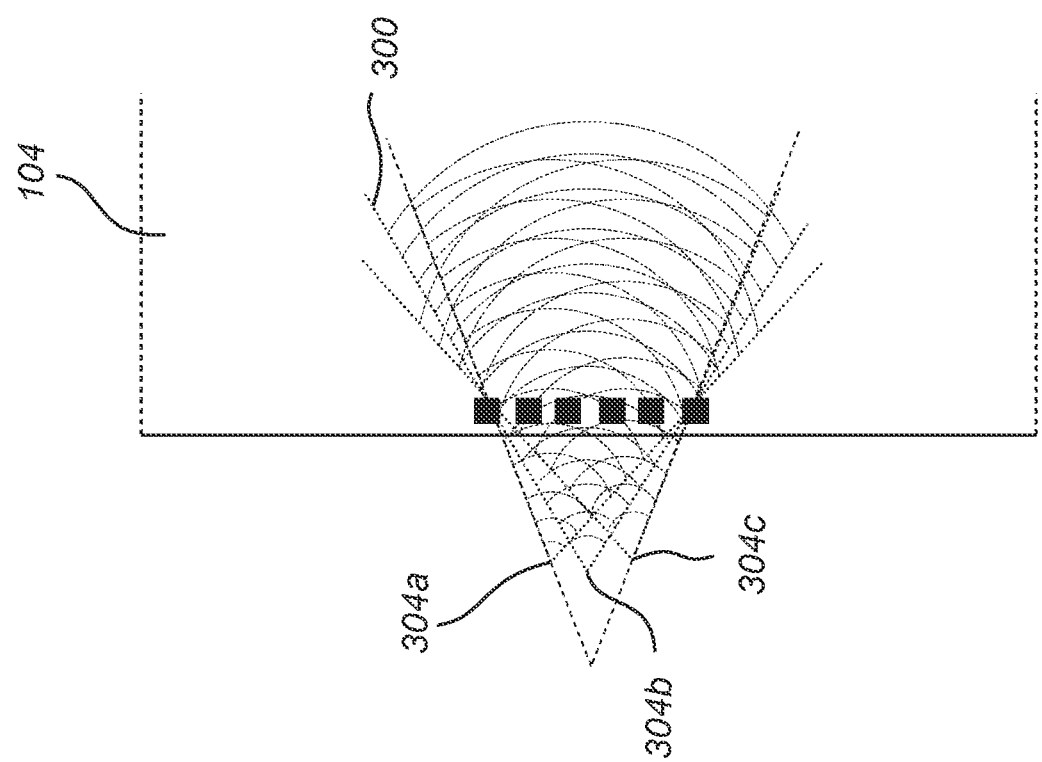
Fig. 3B
Fig. 3A

ULTRASONIC IMAGING DEVICE AND METHOD FOR IMAGE ACQUISITION IN THE ULTRASONIC DEVICE

CROSS-REFERENCE TO RELATED APPLICATIONS

This application is a 371 U.S. National Stage of International Application No. PCT/SE2020/050550, filed Jun. 1, 2020, which claims priority to Swedish Patent Application No. 1950681-5, filed Jun. 10, 2019 and Swedish Patent Application No. 1950682-3, filed Jun. 10, 2019. The disclosures of each of the above applications are incorporated herein by reference in their entirety.

FIELD OF THE INVENTION

The present invention relates to an ultrasonic imaging device and to a method for image acquisition in an ultrasonic device. In particular, the present invention relates to forming an image based on ultrasonic reflections in the imaging device.

BACKGROUND OF THE INVENTION

Biometric systems are widely used as means for increasing the convenience and security of personal electronic devices, such as mobile phones etc. Fingerprint sensing systems in particular are now included in a large proportion of all newly released personal communication devices, such as mobile phones.

Due to their excellent performance and relatively low cost, capacitive fingerprint sensors have been used in an overwhelming majority of all biometric systems.

Among other fingerprint sensing technologies, ultrasonic sensing also has the potential to provide advantageous performance, such as the ability to acquire fingerprint (or palmprint) images from very moist fingers etc.

One class of ultrasonic fingerprint systems of particular interest are systems in which acoustic signals are transmitted along a surface of a device element to be touched by a user, and a fingerprint (palmprint) representation is determined based on received acoustic signals resulting from the interaction between the transmitted acoustic signals and an interface between the device member and the user's skin.

Such ultrasonic fingerprint sensing systems, which are, for example, generally described in US 2017/0053151 may provide for controllable resolution, and allow for a larger sensing area, which may be optically transparent, without the cost of the fingerprint sensing system necessarily scaling with the sensing area and thereby allowing integration of ultrasonic fingerprint sensors in a display of a device.

However, current solutions struggle to provide a high-resolution fingerprint with a large coverage area of the full in-display screen, as it is difficult to handle and process the large amount of RF-data generated for each touch event and thereby apply the image reconstruction and matching procedures required.

Accordingly, there is a need for improved methods and systems for large area fingerprint imaging using ultrasonic technology.

SUMMARY

In view of above-mentioned and other drawbacks of the prior art, it is an object of the present invention to provide an improved method and system for image acquisition in an ultrasonic biometric imaging device using beamforming.

According to a first aspect of the invention, there is provided a method for image acquisition in an ultrasonic biometric imaging device. The method comprises: determining a target area of a touch surface; by a plurality of ultrasonic transducers arranged at a periphery of the touch surface, emitting a shaped ultrasonic beam towards the target area using transmit beamforming; by the ultrasonic transducers, receiving reflected ultrasonic echo signals defining received RF-data, the reflected ultrasonic echo signals resulting from interactions with an object in contact with the touch surface at the target area; subtracting background RF-data from the received RF-data to form a clean image; performing receive side beamforming to form a reconstructed image from the clean image; and for a plurality of reconstructed images resulting from a plurality of emitted ultrasonic beams for a given target area, adding the plurality of reconstructed images to form a summed image.

The present method is aimed at acquiring an image of a biometric feature such as a fingerprint or palm print when a finger or a palm is placed in contact with the touch surface. The touch surface may for example be a surface of a display cover glass in a smartphone, tablet or the like. However, the described method can equally well be implemented in other devices, such as an interactive TV, meeting-table, smartboard, information terminal or any other device having a cover structure where ultrasonic waves can propagate. Since the transducers are arranged at the periphery of the active touch surface, the described method can also be employed in e.g. an interactive shop window or a display cabinet in a store, museum or the like. The biometric object may in some applications be the cheek or ear of a user.

The step of forming a shaped ultrasonic beam may also be referred to as transmit side beamforming, where the beamforming is based on the detected target area of the touch surface. Transmit beamforming may mean using a number of transducer elements in a transmit step so that by adjusting transmission delays of the respective transducers, a focused, defocused, or unfocused ultrasonic beam is generated and emitted towards the target area.

The ultrasonic transducers typically comprise a piezoelectric material generating an ultrasonic signal in response to an electric field applied across the material by means of the top and bottom electrodes. In principle, it is also possible to use other types of ultrasonic transducers, such as capacitive micromachined ultrasonic transducers (CMUT). The ultrasonic transducers will be described herein as transceivers being capable of both transmitting and receiving ultrasonic signals. However, it is also possible to form a system comprising individual and separate ultrasonic transmitters and receivers.

The device is further considered to comprise ultrasonic transducer control circuitry configured to control the transmission and reception of ultrasonic signals and considered to comprise appropriate signal processing circuitry required for extracting an image from the received ultrasonic echo signals.

The ultrasonic signals can be described by radio frequency data, RF-data. The radio spectrum may encompass frequencies from 3 Hz up to 3 THz, and for ultrasonic signals the applicable frequency range is approximately 20 kHz up to several GHz, such as 3 GHz. Accordingly, the received RF-data describes an oscillating signal resulting from the echo of the emitted ultrasonic beam. Similarly, background RF-data describes the received ultrasonic signal for an emitted ultrasonic beam for the case when there is no object in contact with the touch surface. Which ultrasonic frequency or frequency rage to use is determined based on the application at hand and may vary depending on parameters such as required resolution, type of transducer, material in which the ultrasonic signal will propagate, power consumption requirements etc.

The present invention is based on the realization that a method for image acquisition including both transmit and receive beamforming provides a number of advantages over other approaches where a single element is engaged for each transmit-receive (pulse-echo) operation.

By using a focused beam, a higher lateral resolution can be achieved. Another advantageous result of focusing is that the energy aimed at the target area is maximized since less energy is dispersed. The same is true for receive side beamforming which will lead to an increased signal-to-noise ratio (SNR), in turn resulting in an increased penetration depth of the emitted ultrasonic beam.

Furthermore, the described method results in an improved SNR as a result of the summation of a plurality of reconstructed images which acts to suppress random and uncorrelated noise. Moreover, in a device using the described method, the SNR-requirements of the analog-to-digital converters (ADCs) may be lowered since the individual channels of the ADC will not dictate the SNR of the final image.

If a focused beam is used, the energy is more concentrated towards the target and even better sensitivity will be achieved.

If the beam is defocused or unfocused, the acoustic energy is propagating in many different directions and therefore with a lower penetration depth but can cover the finger area with much lower number of repetitions and may thus be used if the target area is close to the transducers.

According to one embodiment of the invention, the method may further comprise forming a final image by taking the envelope of the summed image. By taking the envelope of the summed image, RF-data values of the image which may be both positive and negative are transformed into only positive values. The summed image comprising positive and negative values may for example be used by a fingerprint matching algorithm adapted for handling raw data. However, in some applications it may be desirable to acquire a more visually accurate representation of a fingerprint, which can be achieved by taking the envelope of the summed image as described above.

According to one embodiment of the invention, the method may further comprise converting the received RF-data to in-phase quadrature complex data. Converting the received RF-data to in-phase quadrature complex data may comprise using Hilbert transform. Furthermore, converting the received RF-data to in-phase data makes it straightforward to add the plurality of reconstructed images in-phase to form a summed image. Since the noise of the received RF-data can be considered to be random, the likelihood of the noise to be in-phase from one received set of image data resulting from one ultrasonic beam to the next is very low. Thus, by adding the data in-phase the noise can be significantly suppressed. However, due to the nature of the received RF-data which can have both positive and negative values, interaction of the RF-data belonging to different ultrasonic beams can generate constructive and deconstructive effects. Constructive whenever positive or negative values are added to each other, and deconstructive whenever positive values are added to negative values.

According to one embodiment of the invention, the method may comprise adding the plurality of reconstructed images out-of-phase to form a summed image. As described above, in-phase summation of images may lead to interference effects and in situation when such effects are particularly disadvantageous or when strong interference is observed, it may be desirable to add the images using out-of-phase data. Out-of-phase addition can help to increase the contrast in the resulting summed image by ensuring that the RF-values are always added together without their phase information.

According to one embodiment of the invention, the number of ultrasonic transducers used for receiving the ultrasonic echo signals is the same as the number of ultrasonic transducers used for emitting the shaped ultrasonic beam. Thereby, there is no need to use additional transducers for echo signal reception even though the propagation direction of the echo signals cannot be exactly known.

According to one embodiment of the invention, the method may further comprise controlling a resolution of the final image by controlling the number of emitted ultrasonic beams used for forming a summed image. In a first attempt at forming an image, every second emitted ultrasonic beam may be used for forming a summed image, and if the resolution turns out to be insufficient, all of the emitted ultrasonic beams may be used.

According to one embodiment of the invention, determining the target area comprises receiving information describing the target area from a touch sensing arrangement configured to detect a location of an object in contact with the touch surface. The step of determining the touch area can for example be performed using the capacitive elements of a capacitive touchscreen or by using only the ultrasonic transducers. By determining the target area, e.g. the position of the finger on the screen, the ultrasonic beam can be aimed and transmitted towards the target location. Using an ultrasonic approach to detect the position of the finger on the screen may be a preferred choice since it allows the ultrasonic imaging system to operate as a stand-alone system. When using the ultrasonic system, an unfocused beam (plane wave) is transmitted to cover the whole region of the touch surface, e.g. a display cover glass, and by analyzing the received echoes the position of the finger on the display can be determined with sufficient accuracy. It is here assumed that there is only one finger in contact with the touch surface. For multiple fingers on the display, the transmit procedure is the same, i.e. an unfocused beam is transmitted. However, the received signals require further analysis and a different approach where than one location for the finger position is expected.

According to a second aspect of the invention, there is provided an ultrasonic biometric imaging device comprising: a cover structure comprising a touch surface, a plurality of ultrasonic transducers arranged at a periphery of the touch surface, the plurality of ultrasonic transducers being configured to emit a shaped ultrasonic beam towards the target area using transmit beamforming and to receive a reflected ultrasonic echo signals defining received RF-data, the reflected ultrasonic echo signals resulting from reflections by an object in contact with the touch surface at the target area; and a biometric imaging control unit. The biometric imaging control unit is configured to: subtract background RF-data from the received RF-data to form a clean image; performing receive side beamforming to form a reconstructed image from the clean image; for a plurality of reconstructed images resulting from a plurality of emitted ultrasonic beams for a given target area, add the plurality of reconstructed images to form a summed image; and form a final image by taking the envelope of the summed image.

According to one embodiment of the invention, the plurality of transducers may be arranged in a single row on a single side of the touch surface. Since transducers arranged in a row can be controlled by means of beamforming to generate an ultrasonic beam aimed at a specific target location, it is sufficient to provide transducers on a single side of the touch surface while still being able to acquire an image of a target area anywhere on the touch surface.

According to one embodiment of the invention, the ultrasonic imaging device may further comprise a touch sensing arrangement configured to detect a location of an object in contact with the touch surface. The touch sensing arrangement may for example comprise a plurality of touch sensing elements located under the cover structure, such as in a capacitive touch panel. The touch sensing arrangement may also comprise the same ultrasonic transducers used for acquiring the biometric image.

Additional effects and features of the second aspect of the invention are largely analogous to those described above in connection with the first aspect of the invention.

According to a third aspect of the invention, there is provided a method for acquiring background data in an ultrasonic biometric imaging device, the method comprising: detecting a finger in proximity of a touch surface of the imaging device; determining a target area based on the detected finger; before the finger makes contact with a touch surface, by a plurality of ultrasonic transducers arranged at a periphery of the touch surface, emitting an ultrasonic signal towards the target area; by the ultrasonic transducers, receiving reflected ultrasonic echo signals defined by received radio frequency data (RF-data); and determining background radio frequency data based on the received reflected ultrasonic echo signals.

The described configuration with transducers arranged at the periphery of a touch surface, e.g. under the edge of a cover glass, results in reflected and scattered stationary echoes from e.g. boundaries and corners of the glass. These echoes will be received by the transducers even with no finger is in contact with the touch surface. Such echoes can be referred to as the background signal, RF-back. When the finger is placed on the cover glass, the received signal, RF-total, is described as RF-total=RF-finger+RF-back In order to obtain the RF signal from the finger, RF-finger, the background data, RF-back, must therefore be known or estimated.

By using a so-called hover mode of a capacitive touchscreen, the finger position can be sensed before the actual touch/force is applied on the touch surface, during which time an ultrasound transmit sequence can be executed based on the finger position. The echoes received by the transducers thus describes the background data, i.e. the properties of the target area when no finger is touching the surface. The described method simplifies the background data acquisition and reduces the amount of data otherwise needed to be stored as background data.

According to one embodiment of the invention, emitting an ultrasonic signal towards the target area comprises using a subset of the plurality of ultrasonic transducers, the subset being defined based on the target area. It is for example possible to only activate the transducers in the vicinity of the target area, thereby simplifying the acquisition of background data. Which transducers to be used can thereby be based on the distance from the transducer to the target area, and a subset of transducers is preferably defined such that a sufficient amount of background data can be acquired.

According to one embodiment of the invention, emitting an ultrasonic signal towards the target area comprises emitting a shaped ultrasonic beam towards the target area using transmit beamforming, and wherein determining background radio frequency data based on the received reflected ultrasonic echo signals comprises receive side beamforming. Transmit and receive side beamforming can thus be used to form the background data. Beamforming may be more computationally demanding but it may also make it possible to more accurately acquire background data for the specified target area.

According to one embodiment of the invention, detecting a finger in proximity of a touch surfaces of the imaging device is performed using a capacitive touch sensing element. The capacitive touch element may for example be one or more elements of a capacitive touch screen.

According to one embodiment of the invention, the method further comprises: by a plurality of ultrasonic transducers arranged at a periphery of the touch surface, emitting a shaped ultrasonic beam towards the target area using transmit beamforming; by the ultrasonic transducers, receiving reflected ultrasonic echo signals defined by received radio frequency data (RF-data), the reflected ultrasonic echo signals resulting from interactions with an object in contact with the touch surface at the target area; subtracting the background RF-data from the received RF-data to form a clean image; performing receive side beamforming to form a reconstructed image from the clean image; and for a plurality of reconstructed images resulting from a plurality of emitted ultrasonic beams for a given target area, adding the plurality of reconstructed images to form a summed image.

Moreover, the shaped ultrasonic beams emitted to form a summed image are the same as the shaped ultrasonic beam emitted to acquire the background RF-data. Thereby, it can be ensured that the background data as closely as possible correspond to the background data included in the fingerprint acquisition.

Further effects and features of the third aspect of the invention are largely analogous to those described above in connection with the first and second aspects of the invention.

According to a fourth aspect of the invention, there is provided an ultrasonic biometric imaging device comprising: a cover structure having a touch surface; a capacitive touch sensing element configured to detect a finger in proximity of the touch surface and to determine a target area based on the detected finger; a plurality of ultrasonic transducers arranged at a periphery of the touch surface, the plurality of ultrasonic transducers being configured to: before the finger makes contact with a touch surface, emit an ultrasonic signal towards the target area; receive reflected ultrasonic echo signals defined by received radio frequency data (RF-data); and determine background radio frequency data (RF-data) based on the received reflected ultrasonic echo signals.

According to one embodiment of the invention, the plurality of ultrasonic transducers are configured to emit a shaped ultrasonic beam towards the target area using transmit beamforming and to receive a reflected ultrasonic echo signals defined by received RF-data, the reflected ultrasonic echo signals resulting from reflections by an object in contact with the touch surface at the target area, the ultrasonic imaging device further comprising a biometric imaging control unit configured to: subtract background radio frequency data (RF-data) from the received RF-data to form a clean image; performing receive side beamforming to form a reconstructed image from the clean image; and for a plurality of reconstructed images resulting from a plurality of emitted ultrasonic beams for a given target area, add the plurality of reconstructed images to form a summed image.

Further effects and features of the fourth aspect of the invention are largely analogous to those described above in connection with the first, second and third aspects of the invention.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing an example embodiment of the invention, wherein:

FIGS. 3A-B schematically illustrate features of a method and system according to an embodiment of the invention;

DETAILED DESCRIPTION OF EXAMPLE EMBODIMENTS

In the present detailed description, various embodiments of the system and method according to the present invention are mainly described with reference to a biometric imaging device adapted to form an image of a finger placed on a display glass of a smartphone. It should however be noted that the described technology may be implemented in a range of different applications.

Figure 1A:
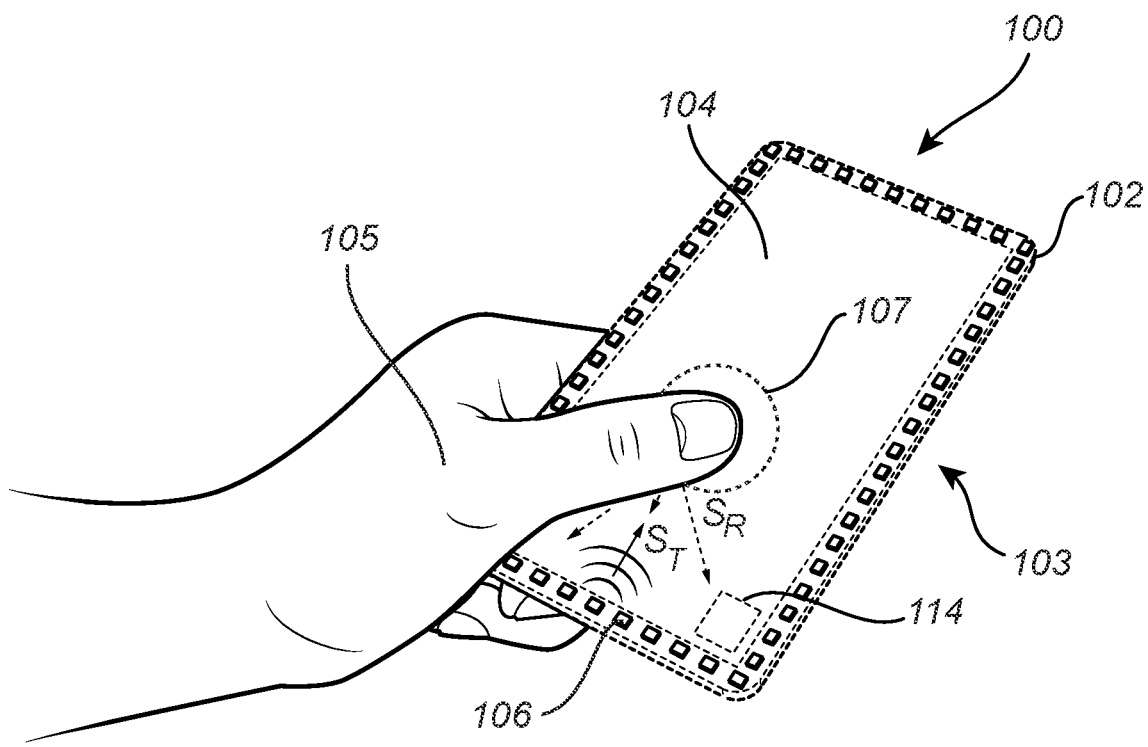
FIG. 1A schematically illustrates a display arrangement comprising a biometric imaging device according to an embodiment of the invention.

FIG. 1A schematically illustrates a biometric imaging device 100 integrated in an electronic device in the form of a smartphone 103. The illustrated smartphone 100 comprises a display panel having a cover structure 102 in the form of a cover glass 102. The cover glass 102 defines an exterior surface 104 configured to be touched by a finger 105, herein referred to as the touch surface 104. The cover structure 102 is here illustrated as a transparent cover glass of a type commonly used in a display panel of the smartphone 103. However, the cover structure 102 may equally well be a non-transparent cover plate as long as the acoustic properties of the cover structure 102 allows for propagation of ultrasound energy.

The display arrangement further comprises a plurality of ultrasonic transducers 106 connected to the cover structure 102 and located at the periphery of the cover structure 102. Accordingly, the ultrasonic transducers 106 are here illustrated as being non-overlapping with an active sensing area 104 of the biometric imaging device formed by the ultrasonic transducers 106 and the cover structure 102. However, the ultrasonic transducers 106 may also be arranged and configured such that they overlap an active sensing area. FIG. 1A illustrates an example distribution of the transducers 106 where the transducers 106 are evenly distributed around the periphery of the cover structure 102 along all sides of the display panel. However, other transducer distributions are equally possible, such as arranging the transducers 106 on one, two or three sides of the display panel, and also irregular distributions are possible.

Figure 1B:
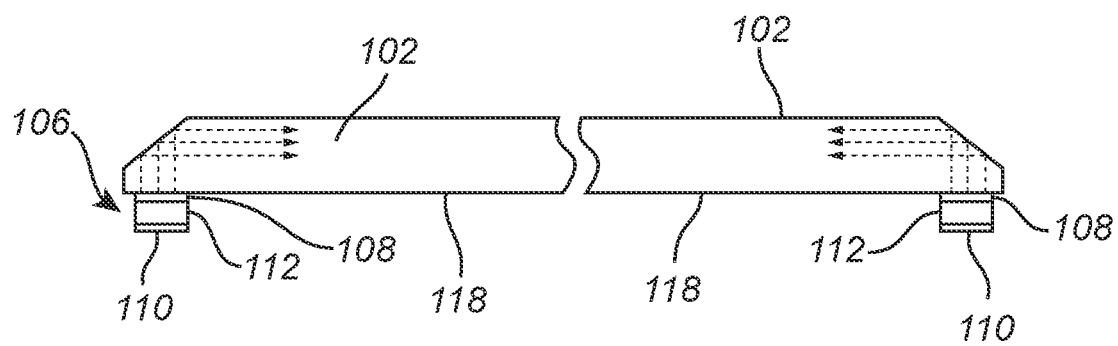
FIG. 1B is a cross section view of a display arrangement comprising a biometric imaging device according to an embodiment of the invention.

FIG. 1B is a cross section view of the cover structure 102 where it is illustrated that the ultrasonic transducers 106 are arranged underneath the cover structure 102 and attached to the bottom surface 118 of the cover structure 102. The ultrasonic transducer 106 is a piezoelectric transducer comprising a first electrode 108 and second electrode 110 arranged on opposing sides of a piezoelectric element 112 such that by controlling the voltage of the two electrodes 108, 110, an ultrasonic signal can be generated which propagates into the cover structure 102.

The pitch of the transducers may be between half the wavelength of the emitted signal and 1.5 times the wavelength, where the wavelength of the transducer is related to the size of the transducer. For an application where it is known that beam steering will be required, the pitch may preferably be half the wavelength so that grating lobes are located outside of an active imaging area. A pitch approximately equal to the wavelength of the emitted signal may be well suited for applications where no beam steering is required since the grating lobes will be close to the main lobe. The wavelength of the transducer should be approximately equal to the size of the features that are to be detected, which in the case of fingerprint imaging means using a wavelength in the range of 50-300 μm. An ultrasonic transducer 106 can have different configurations depending on the type of transducer and also depending on the specific transducer package used. Accordingly, the size and shape of the transducer as well as electrode configurations may vary. It is furthermore possible to use other types of devices for the generation of ultrasonic signals such as micromachined ultrasonic transducers (MUTs), including both capacitive (cMUTs) and piezoelectric types (pMUTs).

Moreover, suitable control circuitry 114 is required for controlling the transducer to emit an acoustic signal having the required properties with respect to e.g. amplitude, pulse shape and timing. However, such control circuitry for ultrasonic transducers is well known to the skilled person and will not be discussed in detail herein.

Each ultrasonic transducer 106 is configured to transmit an acoustic signal $S_T$ propagating in the cover structure 102 and to receive a reflected ultrasonic signal $S_R$ having been influenced by an object 105, here represented by a finger 105, in contact with the sensing surface 104.

The acoustic interaction signals $S_R$ are presently believed to mainly be due to so-called contact scattering at the contact area between the cover structure 102 and the skin of the user (finger 105). The acoustic interaction at the point of contact between the finger 105 and the cover plate 103 may also give rise to refraction, diffraction, dispersion and dissipation of the acoustic transmit signal $S_T$. Accordingly, the interaction signals $S_R$ are advantageously analyzed based on the described interaction phenomena to determine properties of the finger 105 based on the received ultrasonic signal. For simplicity, the received ultrasonic interaction signals $S_R$ will henceforth be referred to as reflected ultrasonic echo signals $S_R$.

Accordingly, the ultrasonic transducers 106 and associated control circuitry 114 are configured to determine properties of the object based on the received ultrasonic echo signal $S_R$. The plurality of ultrasonic transducers 106 are connected to and controlled by ultrasonic transducer control circuitry 114. The control circuitry 114 for controlling the transducers 106 may be embodied in many different ways. The control circuitry 114 may for example be one central control unit 114 responsible for determining the properties of the acoustic signals $S_T$ to be transmitted, and for analyzing the subsequent interaction signals $S_{IN}$. Moreover, each transducer 106 may additionally comprise control circuitry for performing specified actions based on a received command.

The control unit 114 may include a microprocessor, microcontroller, programmable digital signal processor or another programmable device. The control unit 114 may also, or instead, include an application specific integrated circuit, a programmable gate array or programmable array logic, a programmable logic device, or a digital signal processor. Where the control unit 114 includes a programmable device such as the microprocessor, microcontroller or programmable digital signal processor mentioned above, the processor may further include computer executable code that controls operation of the programmable device. The functionality of the control circuitry 114 may also be integrated in control circuitry used for controlling the display panel or other features of the smartphone 100.

Figure 2:
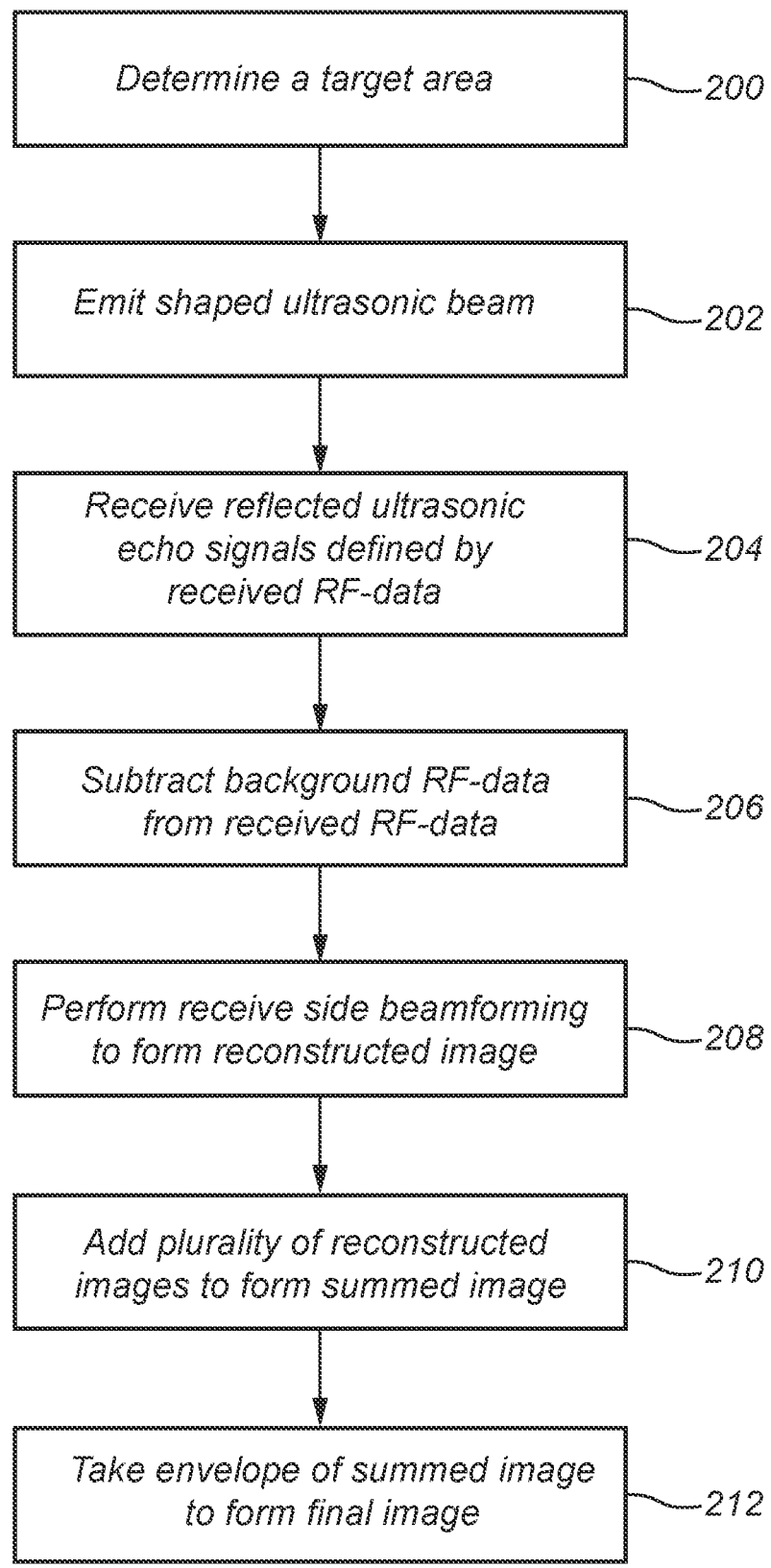
FIG. 2 is a flow chart outlining the general steps of a method for acquiring an image according to an embodiment of the invention.

FIG. 2 is a flow chart outlining the general steps of a method for image acquisition in an ultrasonic biometric imaging device 100 according to an embodiment of the invention. The method will be described with reference to the device 100 illustrated in FIGS. 1A-B.

The first step comprises determining 200 a target area 107 of the touch surface 104. Determining the target area 107 may comprise receiving information describing the target area 107 from a touch sensing arrangement configured to detect a location of an object in contact with the touch surface. The touch sensing arrangement may for example be a capacitive touch panel in a display panel or it may be formed by the ultrasonic transducers.

Once the target area is determined, a shaped ultrasonic beam is emitted 202 by the plurality of ultrasonic transducers 106 towards the target area 107 using transmit beamforming. The ultrasonic beam is thus emitted by a plurality of ultrasonic transducers 106 arranged at a periphery of the touch surface 104 towards a selected subarea of the touch surface. Transmit beamforming can be performed by controlling the firing delays of respective transducers, i.e. the specific time when a pulse from a specific transducer is emitted. Thereby a focused, defocused, or unfocused ultrasonic beam is generated and emitted towards the target area 107.

Next, the ultrasonic transducers receive 204 reflected ultrasonic echo signals defined by the received RF-data. As discussed above, the reflected ultrasonic echo signals $S_R$ result from interactions with an object in contact with the touch surface at the target area.

In order to more clearly distinguish the echo signal $S_R$ in the received RF-data, background RF-data is subtracted 206 from the received RF-data to form what is here referred to as a clean image. The subtraction of the background RF-data from the acquired RF-data can be done either in the raw RF-data or after a receive side beamforming procedure which will be described in further detail below. For subtraction of background RF-data in the RF-data domain, the response of each individual transducer element is stored and a corresponding background measurement for each transducer element is subtracted from the acquired RF-data. It should be noted that all operations are performed in the digital domain, meaning that AD-conversion is performed before subtraction of the background RF-data, and that the background RF-data needs to be available in digital form. The resulting image after subtraction of background RF-data is herein referred to as a clean image.

The background RF-data may be acquired in different ways. The background data may for example be acquired by capturing an image of the entire touch surface either at regular intervals or when it is anticipated that a finger will be placed on the touch surface, for example if prompted by an application in the device. However, capturing an image of the touch surface requires acquiring and storing large amounts of data and if possible, it is desirable to only acquire background data of a subarea of the touch surface corresponding to the target area. This in turn requires prior knowledge of where on the touch surface the finger will be placed.

In a device comprising a capacitive touch screen, it can be possible to use a so-called hover mode of the capacitive touch screen to determine the target are before the actual contact takes place. In the hover mode, the proximity of a finger can be detected, the target area can be anticipated and background RF-data for the anticipated target are can be acquired prior to image acquisition. It would however in principle also be possible to acquire the background noise after the touch has taken place, i.e. when the user removes the finger, even though this may limit the possible implementations of the image acquisition device.

Receive side beamforming to form a reconstructed image from the clean image can be performed 208 either before or after the subtraction of background RF-data described above. The receive side beamforming is performed dynamically by adjusting the delay values of the received echo signals so that they are "focused" at every single imaging pixel. The received signals are focused at any imaging point, which will be repeated until a full image is generated. In general, an example implementation of receive side beamforming referred to as delay-and-sum beamforming can be described by three steps:

1) The delay between each imaging point from the focal point as well as back to each receiving element is estimated.

2) The estimated delay is used in an interpolation step to estimate the RF-data value. The interpolation is used since the delay might be between two samples. For example, a Spline interpolation may be used.

3) The RF amplitudes are summed across all receive channels.

The method further comprises adding 210 a plurality of reconstructed images resulting from a plurality of emitted ultrasonic beams for a given target area to form a summed image. The number of transmit events required for capturing the target area can be estimated based on the relation between the width of the transmitted beam at the target area and the width of the target area. Accordingly, for a focused emitted beam, a larger number of emitted beams is typically required compared to when using an unfocused or defocused beam, assuming that the width of the transmitted beam at the target area is lower than the width of the target area.

The reconstructed images for each transmit event may be either coherently or incoherently added together, i.e. in-phase or out-of-phase depending on if there is a need to reduce the noise in the image (achieved by in-phase addition) or if it is desirable to increase the contrast of the image (can be achieved by out-of-phase addition).

In-phase addition of the reconstructed images can be achieved by converting the received RF-data into in-phase quadrature complex data, IQ-data, thereby making the phase information available. Thereby, reconstructed images represented by IQ data will subsequently be added in-phase (coherently). However, if the reconstructed images should be added out-of-phase (incoherently), IQ data is not needed.

Out-of-phase combining can help to increase the contrast by making sure that the impulse values are always added together without their phase information, i.e. whether they are positive values or negative.

A final image is formed 212 by taking the envelope of the summed image. The final values for every imaging pixel can be either positive or negative due to the nature of the RF-values. However, it is preferred to show the full image based on the brightness of the image. In the RF-values, large values in both positive and negative represent a strong reflectivity and values close to zero represent low reflectivity. Accordingly, envelope detection can be used to convert the original representation into values only in the positive range. However, it should be noted that the step of taking the envelope of the image is optional and that it in some applications is possible to derive sufficient information directly from the summed image.

FIGS. 3A-B schematically illustrate examples of transmit beamforming where FIG. 3A illustrates a defocused beam 300 and FIG. 3B illustrates a focused beam 302. A row of ultrasonic transducers 106 is here placed to the left of the touch surface 104 and in FIG. 3A a plurality of virtual sources 304a-c are illustrated to the left of the transducers 106. In FIG. 3B, the virtual sources 306a-c are instead located on the right-hand side of the row of transducers 106.

Figure 4A:
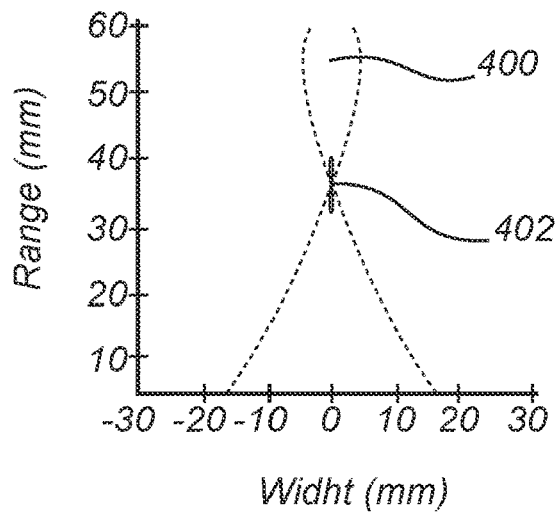
FIG. 4A-C schematically illustrate features of a biometric imaging device according to an embodiment of the invention.

FIG. 4A is a graph showing of the intensity profile 400 of a beamformed shaped ultrasonic transmit beam $S_T$ having a focal point 402 approximately at the center of the image, corresponding to a target area.

Figure 4B:
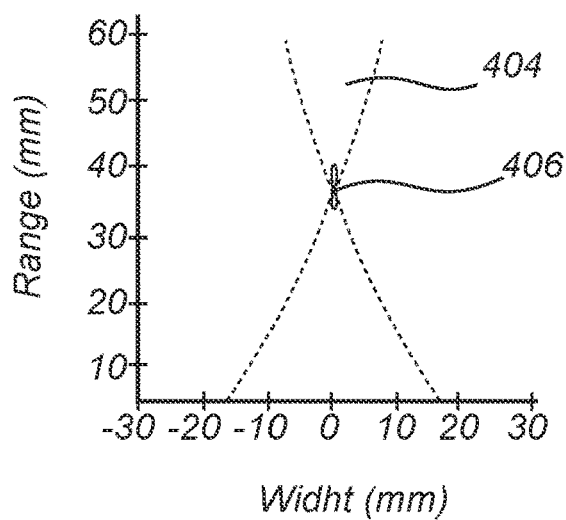

FIG. 4B is a graph showing of the intensity profile 404 of a beamformed received reflected echo signals $S_R$ having a focal point 404 approximately at the center of the image, i.e. at the same location as the focal point 402 of the transmit signal.

Figure 4C:
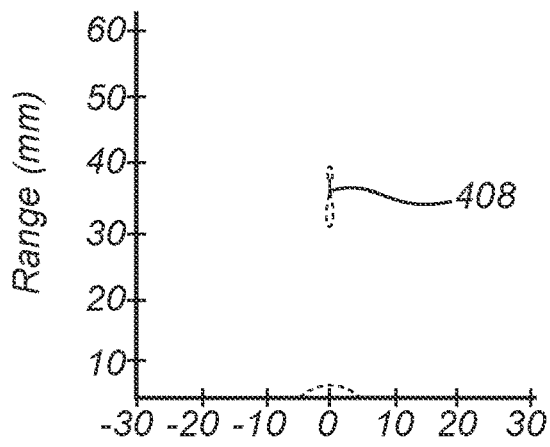

FIG. 4C is a graph illustrating the combination of transmit and receive beamforming forming a combined focus point 408 corresponding to a virtual target area. Accordingly, efficient biometric imaging at the target area 107 can be achieved by the combination of transmit and receive beamforming.

FIG. 4A illustrates a focused beam and the same reasoning applies also when emitting a defocused or unfocused beam with the difference that the resulting focus point will be larger. Thereby, since the focus point is larger, fewer transmissions will be required for covering the target area but the resolution will be correspondingly lower. It is thus possible to select whether to use a focused, unfocused or defocused emitted beam based on the requirements of imaging speed vs imaging resolution.

The spatial resolution of the system refers to the ability to resolve points that are very close to each other. In the described system the lateral resolution (x-axis) and the axial resolution (y-axis) is preferably the same. This will make sure that the total resolution is uniform and symmetrical in both directions. The spatial resolution can be represented by a point spread function (PSF) and in the present case the PSF will substantially circular. Biometric image acquisition requires a spatial resolution which is sufficiently high to resolve the features of the biometric object, e.g. to resolve the ridges and valleys of a fingerprint. However, the described method and system may also be used in applications where a much lower resolution is required, e.g. in a touch detection system.

By using the described system, it is possible to form a touch detection system or a touch tracking system where only a few transducers located on one side of a touch area are required for detecting a touch event by an object such as a finger or the tip of a stylus. The complexity of the system can thereby be very much reduced since it is only required to detect and track a single point. Thereby, there is no need to beamform or reconstruct an image but only to finding the position of the maximum amplitude on the screen and keep tracking that point with high accuracy. The size of the elements could then be relatively large as again there is no need to generate an image, so therefore the signal amplitude can be also relatively high. The processing of the RF data can be handled with a small processor in the ADC ASIC or inside the host CPU.

Figure 5:
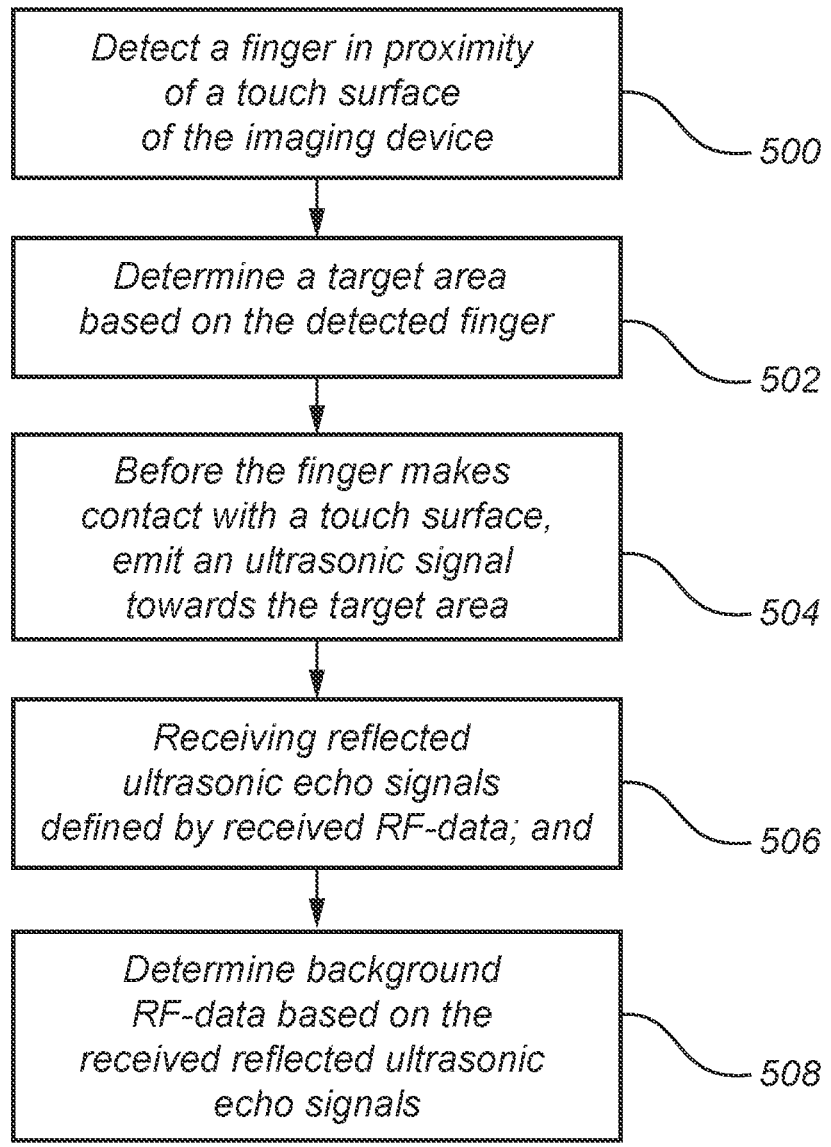
FIG. 5 is a flow chart outlining steps of a method according to an embodiment of the invention.

FIG. 5 is a flowchart describing steps of a method for acquiring background data in an ultrasonic biometric imaging device 100 according to any one of the embodiments described above. The method comprises detecting 500 a finger 105 in proximity of a touch surface 104 of the imaging device 100, for example by operating a capacitive touch screen in a hover detect mode. Once a finger is detected, the next step comprises determining 502 a target area 107 based on the detected finger 105. The target area is thereby the area of the touch surface where the finger can be expected to make contact with the touch surface. The target area may have the same size as a fingerprint, or it may be defined as being somewhat larger than a fingerprint in order to compensate for lateral finger-movements as the finger moves towards the touch surface.

Next, before the finger 105 makes contact with the touch surface 104, by the plurality of ultrasonic transducers 106 arranged at a periphery of the touch surface 104, an ultrasonic signal is emitted 504 towards the target area 107, and by the ultrasonic transducers, reflected ultrasonic echo signals defined by received radio frequency data (RF-data) are received 506.

The method further comprises determining 508 background RF-data based on the received reflected ultrasonic echo signals, and the determined background data can subsequently be subtracted from an acquired fingerprint image in order to improve the quality of the fingerprint image by removing artefacts and the like.

In an embodiment where a subset of transducers are used to acquire background data without beamforming, a fingerprint image capture sequence may comprise collecting data from each active receiver channel, subtracting background RF-data for the respective receive channel, followed by beamforming to form the final image. Thereby, background RF-data is subtracted prior to beamforming which can reduce the computational load compared to if the background capture is performed using beamforming.

Even though the invention has been described with reference to specific exemplifying embodiments thereof, many different alterations, modifications and the like will become apparent for those skilled in the art. Also, it should be noted that parts of the method and system may be omitted, interchanged or arranged in various ways, the method and system yet being able to perform the functionality of the present invention.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A method for acquiring background data in an ultrasonic biometric imaging device, the method comprising:
    detecting a finger in proximity of a touch surface of the imaging device;
    determining a target area based on the detected finger;
    before the finger makes contact with the touch surface, by a plurality of ultrasonic transducers arranged at a periphery of the touch surface, emitting an ultrasonic signal towards the target area;
    by the ultrasonic transducers, receiving reflected ultrasonic echo signals defined by received radio frequency data (RF-data);
    determining background RF-data based on the received reflected ultrasonic echo signals; and
    detecting a finger in proximity of a touch surfaces of the imaging device is performed using a capacitive touch sensing element.

2. The method according to claim 1, wherein emitting an ultrasonic signal towards the target area comprises using a subset of the plurality of ultrasonic transducers, the subset being defined based on the target area.

3. The method according to claim 1, wherein emitting an ultrasonic signal towards the target area comprises emitting a shaped ultrasonic beam towards the target area using transmit beamforming, and wherein determining background radio frequency data (RF-data) based on the received reflected ultrasonic echo signals comprises receive side beamforming.

4. The method according to claim 1, wherein the target area is a sub-area of the touch surface.

5. An ultrasonic biometric imaging device comprising:
    a cover structure having a touch surface;
    a capacitive touch sensing element configured to detect a finger in proximity of the touch surface and to determine a target area based on the detected finger;
    a plurality of ultrasonic transducers arranged at a periphery of the touch surface, the plurality of ultrasonic transducers being configured to:
        before the finger makes contact with the touch surface, emit an ultrasonic signal towards the target area;
        receive reflected ultrasonic echo signals defined by received radio frequency data (RF-data); and
        determine background radio frequency data (RF-data) based on the received reflected ultrasonic echo signals.

6. The ultrasonic imaging device according to claim 5, wherein the capacitive touch sensing element is a capacitive touch screen.

* * * * *